(12) United States Patent
Urdang

(10) Patent No.: US 7,904,936 B2
(45) Date of Patent: Mar. 8, 2011

(54) TECHNIQUE FOR RESEGMENTING ASSETS CONTAINING PROGRAMMING CONTENT DELIVERED THROUGH A COMMUNICATIONS NETWORK

(75) Inventor: Erik G. Urdang, Boulder, CO (US)

(73) Assignee: Time Warner Interactive Video Group, Inc., Stamford, CT (US)

( * ) Notice: Subject to any disclaimer, the term of this patent is extended or adjusted under 35 U.S.C. 154(b) by 1226 days.

(21) Appl. No.: 10/274,087

(22) Filed: Oct. 18, 2002

(65) Prior Publication Data

US 2004/0078811 A1    Apr. 22, 2004

(51) Int. Cl.
*H04N 7/16* (2006.01)
(52) U.S. Cl. .......................... 725/145; 725/143; 725/144
(58) Field of Classification Search .................. 725/58, 725/145
See application file for complete search history.

(56) References Cited

U.S. PATENT DOCUMENTS

| | | | |
|---|---|---|---|
| 5,485,221 A * | 1/1996 | Banker et al. ................. | 348/563 |
| 5,488,409 A * | 1/1996 | Yuen et al. ...................... | 725/41 |
| 5,805,763 A * | 9/1998 | Lawler et al. .................. | 386/83 |
| 5,892,536 A | 4/1999 | Logan et al. | |
| 6,078,348 A | 6/2000 | Klosterman et al. | |
| 6,215,526 B1 | 4/2001 | Barton et al. | |
| 6,381,362 B1 | 4/2002 | Deshpande et al. | |
| 6,725,215 B2 * | 4/2004 | Yamamoto ....................... | 707/3 |
| 2001/0051037 A1 | 12/2001 | Safadi et al. | |
| 2001/0052130 A1 * | 12/2001 | Yap et al. ......................... | 725/90 |
| 2002/0009285 A1 | 1/2002 | Safadi et al. | |
| 2002/0054068 A1 * | 5/2002 | Ellis et al. ...................... | 345/716 |
| 2002/0056103 A1 | 5/2002 | Gong | |
| 2002/0069218 A1 * | 6/2002 | Sull et al. .................... | 707/501.1 |
| 2003/0007092 A1 * | 1/2003 | Sonner et al. .................. | 348/463 |
| 2003/0028882 A1 * | 2/2003 | Davis et al. ..................... | 725/44 |
| 2004/0078817 A1 * | 4/2004 | Horowitz et al. ................ | 725/58 |
| 2004/0148634 A1 * | 7/2004 | Arsenault et al. ............... | 725/89 |

* cited by examiner

*Primary Examiner* — John W Miller
*Assistant Examiner* — Robert Hance
(74) *Attorney, Agent, or Firm* — Straub & Pokotylo; Michael P. Straub

(57) ABSTRACT

Program content is received at a headend of a broadband communication system, along with data concerning scheduled start and end times of the program derived from electronic program guide (EPG) data. After the program is broadcast, the actual broadcast start and end times of the program are compared with the corresponding scheduled times to determine whether there is any start and/or end time variance. If a time variance is determined, the content of the program is redefined to include only its supposed content. The redefined content is then made part of an asset for later retrieval and distribution.

79 Claims, 4 Drawing Sheets

FIG. 3
200

| METADATA | |
|---|---|
| PROGRAM IDENTIFICATION CODE | ~ 202 |
| -- EPG START TIME | ~ 204 |
| -- EPG END TIME | ~ 206 |
| -- PROGRAM TITLE | ~ 208 |
| -- PROGRAM RATING | ~ 210 |
| -- PROGRAM FORMAT | ~ 212 |
| -- PROGRAM DURATION | ~ 214 |
| -- PROGRAM SIZE | ~ 216 |
| -- PROGRAM TYPE | ~ 218 |
| ⋮ | |
| -- PRECEDING PROGRAM IDENTIFICATION CODE | ~ 242 |
| -- SUCCEEDING PROGRAM IDENTIFICATION CODE | ~ 248 |

FIG. 5
600

| METADATA | |
|---|---|
| PROGRAM IDENTIFICATION CODE | ~ 602 |
| -- ACTUAL BROADCAST START TIME | ~ 604 |
| -- ACTUAL BROADCAST END TIME | ~ 606 |
| ⋮ | |

TECHNIQUE FOR RESEGMENTING ASSETS CONTAINING PROGRAMMING CONTENT DELIVERED THROUGH A COMMUNICATIONS NETWORK

FIELD OF THE INVENTION

The invention relates to communications systems and methods, and more particularly to a system and method for defining programming content in generating assets of broadcast programs.

BACKGROUND OF THE INVENTION

Use of electronic program guides (EPGs) is ubiquitous nowadays to manage, identify and select programming content on many program channels made available by cable television (TV) networks. EPGs are also provided by personal video recorders (PVRs), also known as digital video recorders (DVRs), e.g., TiVo and ReplayTV devices, for users to conveniently select programming content to record, without having to set a timer. However, the user's ability to accurately record a broadcast program is contingent upon the accuracy of the broadcast start and end times of the program prescribed by EPG data (hereinafter "EPG start and end times"). In instances where the actual broadcast start or end time of a program is different than the EPG start or end time, the PVR often records programming content that the user did not want, or the PVR fails to record all of the programming content that the user intended to record.

The actual start and end times for a given broadcast program may be different than the EPG start and end times for various reasons. For example, suppose a baseball game is scheduled to broadcast on a given evening from 7:30 PM to 10:30 PM, but because of extra innings or a rain delay, the game continues until 11:15 PM. Although the actual time of the game is from 7:30 PM to 11:15 PM, the start and end times listed and provided by the EPG will be 7:30 PM and 10:30 PM, respectively. Accordingly, if a user selects to record the baseball game using the EPG in this instance, the user would miss the last 45 minutes of the game (i.e., from 10:30 PM to 11:15 PM). Other examples include a Presidential Address or an awards ceremony which lasts for a time that is longer than that the program has been scheduled. Technical difficulties causing the content provider to broadcast a program at a time other than that which is scheduled may cause such a variance as well.

In addition, when the time of one program provided on a specific channel is off schedule, subsequent programs provided by the channel may also be affected, unless the scheduled programming content is manipulated (e.g., certain show or commercial segments are skipped and therefore not broadcast). Thus, if a user records through an EPG a particular show which was scheduled to broadcast from 11:00 PM-11:30 PM, but it actually broadcast from 11:15 PM to 11:45 PM because of a prolonged baseball game, the user would not record the desired programming content. Instead, in this instance, the user's PVR would record the last fifteen minutes of the baseball game and only the first fifteen (out of thirty) minutes of that particular show.

SUMMARY OF THE INVENTION

The invention overcomes the prior art limitations by defining the content of a program based upon the actual broadcast start and/or end time of the program. For example, a content provider provides the content of a first program to a broadband communications system (e.g., a cable TV system), which is scheduled to broadcast at a scheduled start time (or until a scheduled end time). The first program is preceded (or followed) by a second program in a subsequent broadcast of the first and second programs. Information concerning an end time (or a start time) of the second program in the broadcast is then provided to the system. In accordance with the invention, a determination is made whether a difference between the end time (or start time) of the second program and the scheduled start time (or the scheduled end time) of the first program is greater than a threshold. The content of the first program is redefined when it is determined that the difference is greater than the threshold.

Alternatively, after the content of a program, and first data concerning a scheduled start (or end) time of a broadcast of the program are provided to the system, it receives second data concerning an actual start (or end) time of the broadcast of the program. In accordance with the invention, a determination is made whether a difference between the scheduled start (or end) time and the actual start (or end) time is greater than a threshold. The content of the program is adjusted when it is determined that the difference is greater than the threshold.

The adjusted or re-defined content of a program is made part of an asset for later distribution to a user. Thus, with the invention, the user advantageously is able to receive the supposed content of a program in a given asset.

BRIEF DESCRIPTION OF THE DRAWINGS

Further objects, features and advantages of the invention will become apparent from the following detailed description taken in conjunction with the accompanying drawings showing illustrative embodiments of the invention, in which:

FIG. 3 illustrates a first metadata file associated with an entertainment program in accordance with the invention;

FIG. 5 illustrates a second metadata file associated with an entertainment program in accordance with the invention

DETAILED DESCRIPTION

The invention is directed to generating an asset which comprises entertainment programming content (e.g., the video and audio content of an entertainment program) and metadata that describes characteristics of the program. For example, the metadata may describe attributes of the programming content, such as the rating, format, duration, size, or encoding method thereof. The metadata may also include information relating to the broadcast start and end times of a program. In prior art, these start and end times are based on a broadcast schedule prescribed by EPG data (the "EPG start and end times"). However, such EPG start and end times may be different from the actual broadcast start and end times of a program because, for example, the program may be delayed by an unexpected prolongation of a prior broadcast program, or the EPG start and end times are simply inaccurate. As a result, in prior art the content of a broadcast program defined by the EPG start and end times may not encompass the intended programming content when its actual broadcast start and end times deviate from the corresponding EPG times.

In accordance with the invention, the content of a broadcast program which is otherwise defined by inaccurate EPG start and end times is redefined (or resegmented) for storage using its actual broadcast start and end times. As described below, such actual start and end times may be provided, e.g., by human segmenters (or taggers) after the program has broadcast. The programming content is resegmented upon a determination that the EPG start and/or end time in the metadata associated with the program deviate from the actual start and/or end time by more than a predetermined threshold. FIGS. 1A-1D illustrate resegmentation of content of a broadcast program having inaccurate EPG start and end times, in accordance with the invention.

Figure 1A:
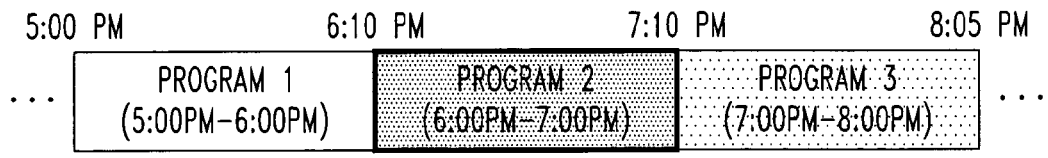
FIGS. 1A-1D jointly illustrate broadcast programming content and redefinition thereof in accordance with the invention.
Figure 1B:
Figure 1C:
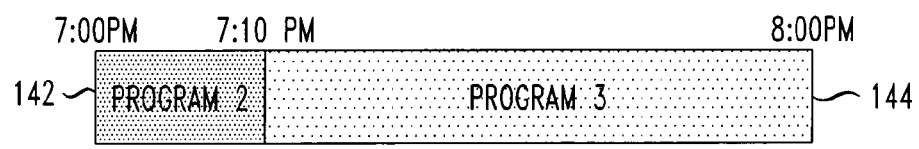
Figure 1D:

In this illustration, Program 1, Program 2 and Program 3 were scheduled to broadcast at 5:00 PM-6:00 PM, 6:00 PM-7:00 PM and 7:00 PM-8:00 PM, respectively, and are reflected as such by the EPG data. However, because of an unexpected prolongation of program 1 (e.g., a live Presidential Address), they actually are broadcast at 5:00 PM-6:10 PM, 6:10 PM-7:10 PM and 7:10 PM-8:05 PM, respectively, as shown in FIG. 1A. As a result, Program 1 is extended at the expense of the time allocated for Programs 2, 3, etc. Segmentation of the programming content based on the EPG data would result in Program 2 (as well as Programs 1 and 3) being defined improperly. Specifically, as shown in FIG. 1B, the program 2 programming content that was scheduled from 6:00 PM-7:00 PM would actually comprise the last 10 minutes of Program 1 (segment 122) and the first 50 minutes of Program 2 (segment 124), i.e., incorrectly defined content of Program 2. In addition, as shown in FIG. 1C, the remaining 10 minutes of Program 2 (segment 142) would be combined with the first 50 minutes of Program 3 (segment 144), resulting in incorrectly defined content of Program 3. By resegmenting the program 2 programming content in accordance with the invention, Program 2 is redefined to include the intended content of the program, which consists of segments 124 and 142, as shown in FIG. 1D.

Figure 2:
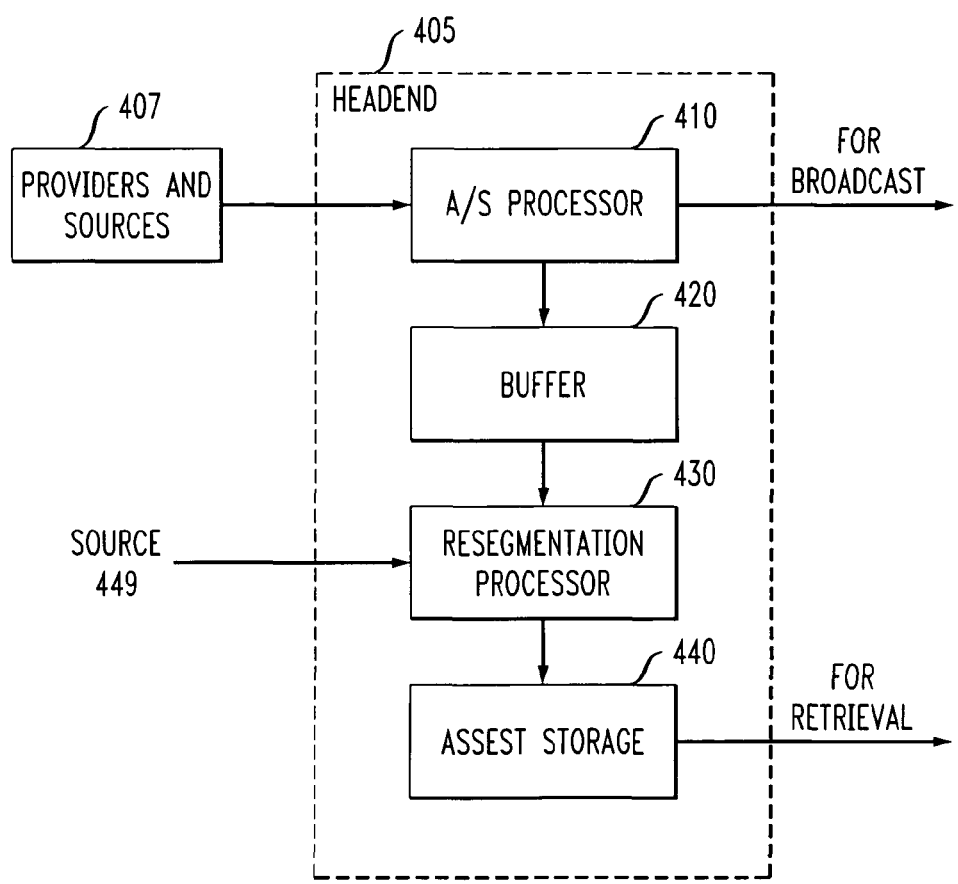
FIG. 2 illustrates system components in a headend of a broadband communications system in accordance with an embodiment of the invention.

In this illustrative embodiment, the actual time data associated with broadcast program content is generated by human taggers. Human taggers are employed to monitor program content that was broadcast, associate actual start and end times with programming content upon viewing such content, and record the actual start and end times of programs (and, in some instances, observe and record the start and end times of segments of programs). It will be appreciated that automated techniques other than such a manual technique for monitoring the actual start and end times of a program may be used, instead. For example, one such automated technique may involve automatic processing the broadcast signals to detect fade-to-black frames typically surrounding the beginning and end of a program and registering the times of such detections FIG. 2 illustrates certain components of headend 405 in a broadband communications system which embody the principles of the invention for generating assets. For example, headend 405 in this instance is part of a cable TV system for delivering information and entertainment programs to set-top terminals (not shown) located at the user premises. As shown in FIG. 2, headend 405 includes, inter alia, acquisition/staging (A/S) processor 410, buffer 420, resegmentation processor 430 and asset storage 440.

Headend 405 receives programs and services from various providers and sources 407, e.g., analog and digital satellite sources, application servers, media servers, the Internet, etc. Analog and digital satellite sources typically provide the traditional forms of television broadcast programs and information services. Application servers typically provide executable code and data for application specific services such as database services, network management services, transactional electronic commerce services, system administration console services, application specific services (such as stock ticker, sports ticker, weather and interactive program guide data), resource management service, connection management services, subscriber cares services, billing services, operation system services, and object management services. Media servers provide time-critical media assets such as Moving Pictures Experts Group 2 (MPEG-2) standard encoded video and audio, MPEG-2 encoded still images, bit-mapped graphic images, PCM digital audio, three dimensional graphic objects, application programs, application data files, etc. Although specific examples of programs and services which may be provided by the aforementioned sources are given herein, other programs and services may also be provided by these or other sources without departing from the spirit and scope of the invention.

Processor 410 in headend 405 processes program materials including, e.g., TV program streams, from one or more of providers and sources 407 in analog and digital forms. Analog TV program streams may be formatted according to the National Television Standards Committee (NTSC) or PAL broadcast standard. Digital TV streams may be formatted according to the Digital Satellite System (DSS), Digital Broadcast Services (DBS), or Advanced Television Standards Committee (ATSC) standard. Processor 410, among other things, extracts program content in the analog and digital TV streams and reformats the content to form one or more MPEG-2 encoded transport streams. Such reformatting may even be applied to those received streams already in an MPEG-2 format. This stems from the fact that the digital content in the received MPEG-2 streams are typically encoded at a variable bit rate (VBR). To avoid data burstiness, processor 410 in a conventional manner re-encodes such digital content at a constant bit rate (CBR) to form transport streams.

In broadcasting programs to users, the transport streams generated by processor 410 are transmitted from headend 405 through a hybrid fiber/coax cable (HFC) network to the set-top terminals at the user premises. In addition, the transport streams may be recorded in headend 405 so that the users at the set-top terminals may manipulate (e.g., pause, fast-forward or rewind) the programming content in the recorded streams in a manner described, e.g., in copending, commonly assigned application Ser. No. 10/263,015, filed Oct. 2, 2002, which is hereby incorporated by reference In addition, A/S processor 410 collects program guide data associated with different TV programs from an application server, which may be different from the sources of the TV programs themselves. Each program when presented to processor 410 is identified by a program identification code, which may be used to locate the corresponding EPG data. In particular, processor 410, while processing a TV program, may locate the corresponding EPG data to create in real time a metadata file associated with the TV program.

FIG. 3 illustrates various data in metadata file 200 associated with a broadcast TV program (e.g., Program 2) identified by code 202 therein. File 200 also includes EPG start time 204 and end time 206 of the program based on the aforementioned EPG data, program title 208, program rating 210 (e.g., G, PG-13, R, etc.), program format 212, duration of the program 214, program size 216, program type 218 (e.g., situation comedy), etc. In addition, for resegmentation purposes, file 200 includes program identification code 242 for identifying the program preceding the broadcast program in question (e.g., Program 1), and program identification code 248 for identifying the program succeeding the broadcast program in question (e.g., Program 3).

Figure 4:
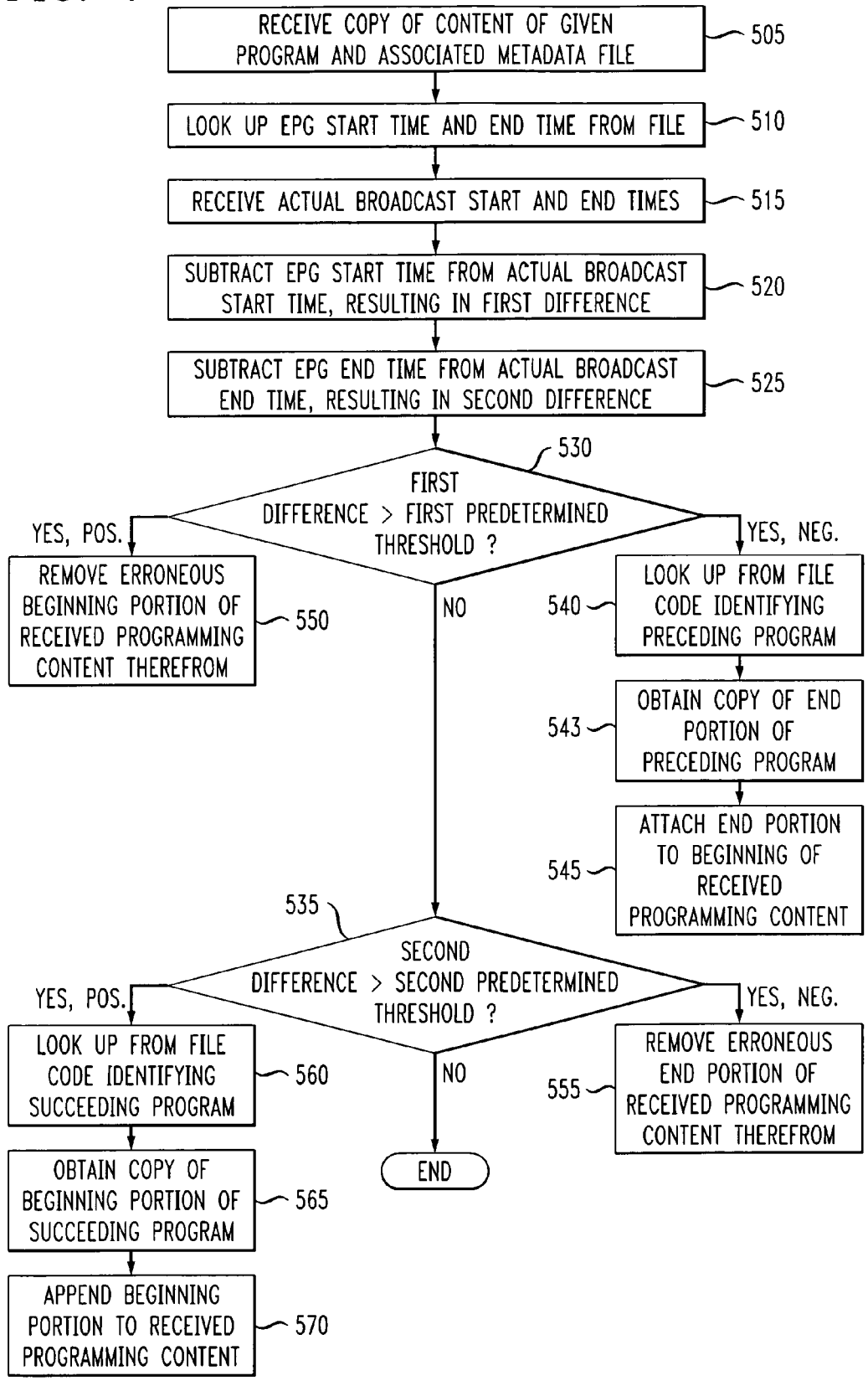
FIG. 4 is a flow chart depicting a process for allocating programming content to an asset in accordance with an embodiment of the invention.

In this instance, the content of each broadcast program and the associated metadata file are temporarily stored in buffer 420 for any program resegmentation performed by resegmentation processor 430 in accordance with the invention. FIG. 4 illustrates a process for carrying out any required resegmentation of content of a given program in buffer 420. At step 505, processor 430 receives from buffer 420 a copy of content of the given program and its associated metadata file, say, file 200. Processor 430 at step 510 looks up EPG start time 204 and EPG end time 206 from file 200. In addition, processor 430 at step 515 receives the actual broadcast start and end times of the given program from source 449 providing such data in the form of a metadata file (e.g., generated by the aforementioned human taggers). FIG. 5 illustrates one such metadata file, denoted 600. As shown in FIG. 5, file 600 includes program identification code 602 identifying the broadcast TV program in question, its actual broadcast start time 604, its actual broadcast end time 606, etc.

Processor 430 at step 520 subtracts the EPG start time 204 from actual broadcast start time 604, resulting in a first time difference. Similarly, processor 430 at step 525 subtracts EPG end time 206 from actual broadcast end time 606, resulting in a second time difference.

It should be noted at this point that when comparing the EPG start time with the program's actual start time, the comparison may be made instead with the preceding program's actual end time as the preceding program's actual end time and the current program's actual start time are the same or substantially the same. Similarly when comparing the EPG end time with the program's actual end time, the comparison may be made instead with the succeeding program's actual start time as the succeeding program's actual start time and the current program's actual end time are the same or substantially the same.

Processor 430 at step 530 determines whether the absolute value of the first difference is greater than a first predetermined threshold, having a zero or nonzero value. It will be appreciated that the actual first threshold value may vary from a fraction of a second to a few minutes, depending on the importance of the content in the beginning of the given program. The more important the beginning content is (e.g., breaking news in the beginning of a news report), the smaller the first threshold value. If it is determined that the absolute value of the first difference is not greater than the first predetermined threshold, processor 430 at step 535 determines whether the absolute value of the second difference is greater than a second predetermined threshold, having a zero or nonzero value. It will be appreciated that the actual second threshold value may vary from a fraction of a second to a few minutes, depending on the importance of the content close to the end of the given program. The more important the ending content is (e.g., the closing minutes of a football game), the smaller the second threshold value. If it is determined that the absolute value of the second difference is not greater than the second predetermined threshold, processor 430 concludes that the EPG start and end times are sufficiently accurate and no resegmentation is required, the process then comes to an end.

If, however, the first time difference resulting from step 520 has an absolute value greater than the first predetermined threshold, and is a negative value, it follows that the received programming content from buffer 420 lacks a beginning portion of the given program. In that case, processor 430 at step 540 looks up from file 200 code 242 identifying the preceding program. At step 543, processor 430 obtains from buffer 420 a copy of an end portion of the preceding program identified by code 242, whose length corresponds to the first time difference. Processor 430 at step 545 attaches the end portion thus obtained to the beginning of the received programming content.

If, however, the first time difference resulting from step 520 has an absolute value greater than the first predetermined threshold, and is a positive value, it follows that a portion of the preceding program is erroneously included in the beginning of the received programming content. In that case, processor 430 at step 550 removes the erroneous beginning portion of the received programming content therefrom, whose length corresponds to the first time difference.

If, however, the second time difference resulting from step 525 has an absolute value greater than the second predetermined threshold, and is a negative value, it follows that a portion of the succeeding program is erroneously included in an end portion of the received programming content. In that case, processor 430 at step 555 removes the erroneous end portion of the received programming content therefrom, whose length corresponds to the second time difference.

If, however, the second time difference resulting from step 525 has an absolute value greater than the second predetermined threshold, and is a positive value, it follows that the received programming content from buffer 420 lacks an end portion of the given program. In that case, processor 430 at step 560 looks up from file 200 code 248 identifying the succeeding program. At step 565, processor 430 obtains from buffer 420 a copy of a beginning portion of the succeeding program identified by code 248, whose length corresponds to the second time difference. Processor 430 at step 570 appends the beginning portion thus obtained to the received programming content.

Thus, the output of the process of FIG. 4 includes the intended programming content of the given program. The resulting programming content is stored in asset storage 440 as part of the asset of the given program for later retrieval and distribution.

The foregoing merely illustrates the principles of the invention. It will thus be appreciated that those skilled in the art will be able to devise numerous other arrangements which embody the principles of the invention and are thus within its spirit and scope.

For example, although the resegmentation process of FIG. 4 involves redefining the beginning portion and end portion of an individual program, and such a process may be repeated for each program in succession, it should be appreciated that, in some instances, one achieves the same result by redefining only the beginning portions or end portions of the successive programs.

Finally, the headend components in FIG. 1 are disclosed herein in a form in which various functions are performed by discrete functional blocks. However, any one or more of these functions could equally well be embodied in an arrangement in which the functions of any one or more of those blocks or indeed, all of the functions thereof, are realized, for example, by one or more appropriately programmed processors.

What is claimed is:

1. A method for defining content of a first program scheduled to be broadcast at a scheduled start time, a second program preceding the first program in a broadcast of the first and second programs, the content of the first program being defined starting from the scheduled start time, the method comprising operating a headend of a broadcast system to perform the following steps:

storing broadcast content including at least a portion of said first and second programs;

receiving an end time of the second program in the broadcast;

determining whether a difference in time between the end time of the second program and the scheduled start time of the first program is greater than a threshold amount of time;

processing the stored broadcast content as a function of said received information to re-define the content of the first program when it is determined that the difference in time is greater than the threshold amount of time; and storing the re-defined content for subsequent retrieval.

2. The method of claim 1,
wherein said storing the broadcast content includes storing the broadcast content including at least a portion of said first and second programs in a buffer;
wherein storing the redefined content includes storing the re-defined content in a storage device from which assets can be retrieved for on-demand content delivery; and
wherein if the difference in time indicates that the end time of the second program is later than the scheduled start time of the first program by more than the threshold, the content of the first program is redefined by at least excluding, from the content, a content segment broadcast between the scheduled start time and the end time.

3. The method of claim 1, wherein if the difference in time indicates that the end time of the second program is earlier than the scheduled start time of the first program by more than the threshold, the content of the first program is redefined by at least including, in the content, a content segment broadcast between the end time and the scheduled start time.

4. The method of claim 1, wherein data concerning the scheduled start time and the information concerning the end time are from different sources.

5. The method of claim 1, wherein the scheduled start time is derived from program guide data.

6. The method of claim 1, wherein the end time is received after the first program is broadcast.

7. The method of claim 1, wherein the redefined content of the first program is made part of an asset.

8. The method of claim 1, wherein the threshold has a non-zero value.

9. The method of claim 1, further comprising:
storing broadcast content; and
wherein re-defining the content of the first program includes:
changing a set of stored broadcast content defined as corresponding to the first program.

10. The method of claim 9, wherein said storing the re-defined content includes storing the defined content in a storage device for subsequent retrieval.

11. The method of claim 10,
wherein the step of storing broadcast content includes storing broadcast content including more broadcast content than the content of said first program in a buffer; and
wherein the step of storing the re-defined content includes storing the re-defined content in a storage device from which programs are retrieved for post broadcast delivery.

12. The method of claim 1, wherein said information concerning an end time of the second program in the broadcast is received after the end of the broadcast.

13. The method of claim 1, wherein said end time of the second program indicates an end time which is earlier than the scheduled start time of the first program.

14. The method of claim 1, wherein said threshold is a fraction of a second.

15. The method of claim 1, wherein said threshold is a few minutes.

16. A method for defining content of a first program which is scheduled to be broadcast until a scheduled end time, a second program succeeding the first program in a broadcast of the first and second programs, the content of the first program being defined ending at the scheduled end time, the method comprising:
storing, at a communications system headend, broadcast content including at least a portion of said first and second programs;
receiving a start time of the second program in the broadcast;
determining whether a difference in time between the start time of the second program and the scheduled end time of the first program is greater than a threshold amount of time;
processing the stored broadcast content as a function of said received information to re-define the content of the first program when it is determined that the difference in time is greater than the threshold amount of time; and
storing, at the communications system headend, the re-defined content for subsequent retrieval.

17. The method of claim 16, wherein if the difference in time indicates that the start time of the second program is later than the scheduled end time of the first program by more than the threshold amount of time, the content of the first program is redefined by at least including, in the content, a content segment broadcast between the scheduled end time and the start time.

18. The method of claim 16, wherein if the difference indicates that the start time of the second program is earlier than the scheduled end time of the first program by more than the threshold amount of time, the content of the first program is redefined by at least excluding, from the content, a content segment broadcast between the start time and the scheduled end time.

19. The method of claim 16, further comprising receiving an identifier identifying the second program.

20. The method of claim 16, wherein data concerning the scheduled end time and the information concerning the start time are from different sources.

21. The method of claim 16, wherein the scheduled end time is derived from program guide data.

22. The method of claim 16, wherein the start time is received after at least a portion of the second program is broadcast.

23. The method of claim 16, further comprising:
storing, prior to said re-defining step, content of the first program with additional program content; and
wherein re-defining the content of the first program includes:
defining a set of content to correspond to the first program which is different from stored content defined by a scheduled first program start time and a scheduled first program end time.

24. The method of claim 23, wherein said storing, prior to said re-defining step is performed using a buffer used to buffer broadcast programs.

25. A method for generating an asset containing content of a program, comprising:
storing, at a communications system headend, broadcast content including said program;

receiving first data concerning a scheduled start time of a broadcast of the program, and an actual start time of the broadcast of the program;

subtracting the scheduled start time from the actual start time to generate a first difference;

determining whether the absolute value of the first difference is greater than a first threshold;

adjusting the stored broadcast content of the program when it is determined that the difference is greater than the threshold, the adjusting performed on the stored broadcast content of the program depending on whether said first difference is positive or negative; and storing, at the communications system headend, the adjusted content of the program to generate said asset for subsequent retrieval.

26. The method of claim 25, wherein if the difference indicates that the actual start time is later than the scheduled start time by more than the threshold, the content of the program is adjusted by at least excluding, from the content, a content segment broadcast between the scheduled start time and the actual start time.

27. The method of claim 25, wherein if the difference indicates that the actual start time is earlier than the scheduled start time by more than the threshold, the content of the program is adjusted by at least including, in the content, a content segment broadcast between the actual start time and the scheduled start time.

28. The method of claim 25, wherein the first data and the actual start time are from different sources.

29. The method of claim 25, wherein the first data is derived from program guide data.

30. The method of claim 25, wherein the actual start time is received after a second program is broadcast.

31. The method of claim 25, wherein the threshold has a non-zero value.

32. The method of claim 25, further comprising:
storing, prior to said adjusting step, content of the first program with additional program content; and
wherein adjusting the content of the first program includes:
adjusting a set of content corresponding to the first program to include content which is different from stored content defined by a scheduled first program broadcast start time and a scheduled first program broadcast end time.

33. The method of claim 32, wherein said storing, prior to said adjusting step is performed using a buffer used to buffer broadcast programs.

34. The method of claim 25, wherein adjusting the stored broadcast content includes:
subtracting the scheduled end time of the program from the actual broadcast end time of the program to generate a second difference.

35. The method of claim 34, further comprising:
determining if said second difference is greater than a second predetermined threshold, when the first difference is not greater than said threshold.

36. The method of claim 35, further comprising:
appending a portion of a succeeding program when said second difference is positive and said second difference exceeds the second predetermined threshold.

37. A method for generating an asset containing content of a program, comprising:
storing at a communications system headend broadcast content including said program;

receiving first data concerning a scheduled end time of a broadcast of the program and second data said second data being an actual end time of the broadcast of the program;

determining whether a difference between the scheduled end time and the actual end time is greater than a threshold;

adjusting the stored broadcast content of the program when it is determined that the difference is greater than the thresholds; and storing, at the communications system headend, the adjusted content of the program to generate said asset for subsequent retrieval.

38. The method of claim 37, wherein if the difference indicates that the actual end time is later than the scheduled end time by more than the threshold, the content of the program is adjusted by at least including, in the content, a content segment broadcast between the scheduled start time and the actual start time.

39. The method of claim 37, wherein if the difference indicates that the actual end time is earlier than the scheduled end time by more than the threshold, the content of the program is adjusted by at least excluding, from the content, a content segment broadcast between the actual end time and the scheduled end time.

40. The method of claim 37, wherein the first data and the second data are from different sources.

41. The method of claim 37, wherein the first data is derived from program guide data.

42. The method of claim 37, wherein the second data is received after a second program is broadcast.

43. The method of claim 37, wherein the threshold has a non-zero value.

44. The method of claim 37, further comprising:
storing, prior to said re-adjusting step, content of the first program with additional program content; and
wherein adjusting the content of the first program includes:
adjusting a set of content corresponding to the first program to include content which is different from stored content defined by a scheduled first program broadcast start time and a scheduled first program broadcast end time.

45. The method of claim 44, wherein said storing, prior to said adjusting step is performed using a buffer used to buffer broadcast programs.

46. A system for defining content of a first program which is scheduled to be broadcast at a scheduled start time, a second program preceding the first program in a broadcast of the first and second programs, the content of the first program being defined starting from the scheduled start time, the system comprising:
a buffer, located at a communications system headend, for storing broadcast content including said program;
an interface for receiving an end time of the second program in the broadcast;
a processor for determining whether a difference between the end time of the second program and the scheduled start time of the first program is greater than a threshold, the stored broadcast content of the first program being redefined when it is determined that the difference is greater than the threshold; and
storage, located at the communications system headend, for storing the redefined content.

47. The system of claim 46, wherein if the difference indicates that the end time of the second program is later than the scheduled start time of the first program by more than the threshold, the content of the first program is redefined by at least excluding, from the content, a content segment broadcast between the scheduled start time and the end time.

48. The system of claim 46, wherein if the difference indicates that the end time of the second program is earlier than the scheduled start time of the first program by more than the threshold, the content of the first program is redefined by at least including, in the content, a content segment broadcast between the end time and the scheduled start time.

49. The system of claim 46, further comprising a second interface for receiving an identifier identifying the second program.

50. The system of claim 46, wherein data concerning the scheduled start time and the information concerning the end time are from different sources.

51. The system of claim 46, wherein the scheduled start time is derived from program guide data.

52. The system of claim 46, wherein the information concerning the end time is received after the first program is broadcast.

53. The system of claim 46, wherein the redefined content of the first program is made part of an asset.

54. The system of claim 46, wherein the threshold has a non-zero value.

55. A system for defining content of a first program which is scheduled to be broadcast until a scheduled end time, a second program succeeding the first program in a broadcast of the first and second programs, the content of the first program being defined ending at the scheduled end time, the system comprising:
   a buffer, located at a communications system headend, for storing broadcast content including said program;
   an interface for receiving a start time of the second program in the broadcast;
   a processor for determining whether a difference between the start time of the second program and the scheduled end time of the first program is greater than a threshold, the stored broadcast content of the first program being redefined when it is determined that the difference is greater than the threshold; and
   storage, located at the communications system headend, for storing the redefined content.

56. The system of claim 55, wherein if the difference indicates that the start time of the second program is later than the scheduled end time of the first program by more than the threshold, the content of the first program is redefined by at least including, in the content, a content segment broadcast between the scheduled end time and the start time.

57. The system of claim 55, wherein if the difference indicates that the start time of the second program is earlier than the scheduled end time of the first program by more than the threshold, the content of the first program is redefined by at least excluding, from the content, a content segment broadcast between the start time and the scheduled end time.

58. The system of claim 55, further comprising a second interface for receiving an identifier identifying the second program.

59. The system of claim 55, wherein data concerning the scheduled end time and the information concerning the start time are from different sources.

60. The system of claim 55, wherein the scheduled end time is derived from program guide data.

61. The system of claim 55, wherein the information concerning the start time is received after at least a portion of the second program is broadcast.

62. The system of claim 55, wherein the redefined content of the first program is made part of an asset.

63. The system of claim 55, wherein the threshold has a non-zero value.

64. A system for generating an asset containing content of a program, comprising:
   a buffer, located at a communications system headend, for storing broadcast content including said program;
   an interface for receiving an actual start time of the broadcast of the program;
   a processor for determining whether a difference between a scheduled start time of the program and the actual start time is greater than a threshold, the stored broadcast content of the program being adjusted when it is determined that the difference is greater than the threshold; and
   storage, located at the communications system headend, for storing said adjusted content to generate the asset, said asset containing the adjusted content and being available for subsequent retrieval.

65. The system of claim 64, wherein the scheduled start time and the actual start time are from different sources.

66. The system of claim 64, wherein the scheduled start time is from program guide data.

67. The system of claim 64, wherein the actual start time is received after the second program is broadcast.

68. The system of claim 64, wherein the threshold has a non-zero value.

69. A system for generating an asset containing content of a program, the content of the program and first data concerning a scheduled end time of a broadcast of the program being provided to the system, comprising:
   a buffer, located at a communications system headend, for storing broadcast content including said program;
   an interface for receiving second data, said second data being an actual end time of the broadcast of the program;
   a processor for determining whether a difference between the scheduled end time and the actual end time is greater than a threshold, the stored broadcast content of the program being adjusted when it is determined that the difference is greater than the threshold; and
   storage, located at the communications system headend, for storing said adjusted content to generate the asset, said asset containing the adjusted content and being available for subsequent retrieval.

70. The system of claim 69, wherein if the difference indicates that the actual end time is later than the scheduled end time by more than the threshold, the content of the program is adjusted by at least including, in the content, a content segment broadcast between the scheduled start time and the actual start time.

71. The system of claim 69, wherein if the difference indicates that the actual end time is earlier than the scheduled end time by more than the threshold, the content of the program is adjusted by at least excluding, from the content, a content segment broadcast between the actual end time and the scheduled end time.

72. The system of claim 69, wherein the first data and the second data are from different sources.

73. The system of claim 69, wherein the first data is derived from program guide data.

74. The system of claim 69, wherein the second data is received after the second program is broadcast.

75. The system of claim 69, wherein the threshold has a non-zero value.

76. A method for defining content of a broadcast program scheduled to end at a scheduled time, the method comprising:

storing broadcast content including at least a portion of said broadcast program and a portion of a second program broadcast following said broadcast program in a storage device;

receiving as input an actual end time of said broadcast program;

determining, after the broadcast of said broadcast program, whether a difference between the actual end time of said broadcast program and the scheduled end time of said broadcast program is greater than a threshold;

re-defining the stored broadcast content of the broadcast program when it is determined that the difference is greater than the threshold; and storing the re-defined content for subsequent retrieval thereof.

77. The method of claim 76, wherein the actual end time is provided by human input after the program has been broadcast.

78. The method of claim 76, wherein re-defining the stored broadcast content includes resegmenting stored broadcast content so that stored program content, indicated by electronic program guide information indicating a broadcast schedule, to correspond to the second program, is defined to be part of said broadcast program.

79. The method of claim 76, wherein said actual end time of the broadcast program is determined from information obtained from a source other than an electronic program guide.

* * * * *